United States Patent
Barancyk et al.

(12) 
(10) Patent No.: US 6,228,953 B1
(45) Date of Patent: May 8, 2001

(54) PROCESS FOR THE PREPARATION OF CARBAMATE FUNCTIONAL POLYMERS

(75) Inventors: Steven V. Barancyk; Debra L. Singer, both of Wexford, PA (US)

(73) Assignee: PPG Industries, Ohio, Inc., Cleveland, OH (US)

( * ) Notice: Subject to any disclaimer, the term of this patent is extended or adjusted under 35 U.S.C. 154(b) by 0 days.

(21) Appl. No.: 09/378,319

(22) Filed: Aug. 20, 1999

(51) Int. Cl.[7] ............................. C08R 8/30; C08G 83/00
(52) U.S. Cl. .................. 525/374; 525/329.9; 525/409; 525/437; 525/453; 525/460; 525/398
(58) Field of Search ................. 525/374, 329.9, 525/409, 437, 453, 460, 398

(56) References Cited

U.S. PATENT DOCUMENTS

| | | | |
|---|---|---|---|
| 2,871,259 | 1/1959 | Levy | 260/482 |
| 2,917,535 | 12/1959 | Britton et al. | 260/482 |
| 2,934,559 | 4/1960 | Beinfest et al. | 260/482 |
| 3,173,941 | 3/1965 | Levy et al. | 260/482 |
| 3,219,686 | 11/1965 | Beinfest et al. | 260/482 |
| 3,524,876 | 8/1970 | Gregson | 260/482 |
| 3,853,960 | 12/1974 | Crowther | 260/482 B |
| 4,156,784 | 5/1979 | Dockner et al. | 560/157 |
| 4,207,073 | 6/1980 | Peterson et al. | 8/187 |
| 4,443,622 | 4/1984 | Smith | 560/166 |
| 5,412,049 | * 5/1995 | Agyropoulos et al. | 526/312 |
| 5,593,733 | * 1/1997 | Mayo | 427/407.2 |
| 5,665,433 | * 9/1997 | Moussa et al. | 427/377 |
| 5,709,950 | * 1/1998 | Burgman et al. | 525/406 |
| 5,976,615 | * 11/1999 | Menovcik et al. | 525/374 |

FOREIGN PATENT DOCUMENTS

| | | | |
|---|---|---|---|
| 51-4124 | 1/1976 | (JP) | C07C/125/06 |

* cited by examiner

Primary Examiner—Donald R. Wilson
(74) Attorney, Agent, or Firm—William J. Uhl; Deborah M. Altman

(57) ABSTRACT

A method of preparing a carbamate functional polymer or oligomer is provided. The method comprises: (a) preparing a reaction mixture comprising a lower alkyl carbamate, a hydroxyl functional polymer or oligomer, and an alcohol different from and having a higher boiling point than an alcohol from which the lower alkyl carbamate is derived; and (b) heating the reaction mixture to form a carbamate functional polymer or oligomer. Also provided is a method of preparing a carbamate functional acrylic polymer by preparing a similar reaction mixture using acrylic monomers containing hydroxyl groups or groups that can be converted to hydroxyl groups and heating the reaction mixture in the presence of a free radical initiator and an esterification catalyst.

15 Claims, No Drawings

PROCESS FOR THE PREPARATION OF CARBAMATE FUNCTIONAL POLYMERS

FIELD OF THE INVENTION

The present invention relates to an improved process for preparing carbamate functional polymers via a transcarbamoylation reaction.

BACKGROUND OF THE INVENTION

Aminoplast-cured coating compositions containing polymeric polyols are well known and provide many excellent coating properties. They are inexpensive, durable, and attractive. However, it is widely recognized that such coatings, particularly clear coats, have poor resistance to etching by acid due to the vulnerable ether linkages that are formed between the polyol and aminoplast during curing. Because many geographic areas encounter acidic precipitation, acid etch resistance in coatings is becoming an increasingly desirable property, particularly for automotive coatings.

Coating systems of the prior art which are known to be resistant to acid etch include acid-epoxy curable compositions such as those disclosed in U.S. Pat. No. 4,681,811 and compositions containing hydroxyl functional polymers reacted with isocyanates or polyisocyanates to form polyurethanes. The isocyanates are expensive and the toxicity of the isocyanates is an additional drawback.

Other more recent, promising developments in the field of acid etch resistant coatings include aminoplast-carbamate cured coating compositions, such as those disclosed in U.S. Pat. No. 5,814,410. Carbamate functional polymers are less expensive than isocyanates, do not have the same toxicity drawbacks, and yet provide the same durable urethane bonds in the cured film. A number of processes are available for preparing the carbamate functional polymers, including transcarbamoylation of hydroxyl functional polymers as disclosed in U.S. Pat. No. 5,663,244. Transcarbamoylation of a polymeric polyol using a lower alkyl carbamate is a desirable reaction process because of the relatively low cost, simplicity, and raw material availability. However, high volatility of many lower alkyl carbamates can result in loss of the carbamate from the reaction mixture by sublimation or distillation, leading to poor conversion of hydroxyl to carbamate groups and fouling of the overhead components of the reactor system.

It would be desirable to provide a process for preparing carbamate functional polymers or oligomers via transcarbamoylation using lower alkyl carbamates with improved yields and without loss of reactants.

SUMMARY OF THE INVENTION

In accordance with the present invention, a process for preparing carbamate functional polymers or oligomers is provided. The process comprises: (a) preparing a reaction mixture comprising a lower alkyl carbamate, a hydroxyl functional polymer or oligomer, and an alcohol different from and having a higher boiling point than an alcohol from which the lower alkyl carbamate is derived; and (b) heating the reaction mixture to form a carbamate functional polymer or oligomer.

Also provided is a method of preparing a carbamate functional acrylic polymer by preparing a similar reaction mixture using acrylic monomers containing hydroxyl groups or groups that can be converted to hydroxyl groups and heating the reaction mixture in the presence of a free radical initiator and an esterification catalyst.

Other than in the operating examples, or where otherwise indicated, all numbers expressing quantities of ingredients, reaction conditions, and so forth used in the specification and claims are to be understood as modified in all instances by the term "about".

DETAILED DESCRIPTION

The hydroxyl functional polymer or oligomer used to prepare the carbamate functional polymer or oligomer according to the process of the present invention may be any type of polymeric or oligomeric polyol known to those skilled in the art, particularly those commonly used in curable film-forming compositions. The hydroxyl functional polymer or oligomer used in the process of the present invention is most often a polyether polyol, an acrylic polyol, a polyester polyol, or a polyurethane polyol.

Examples of suitable polyether polyols are polyalkylene ether polyols which include those having the following structural formula:

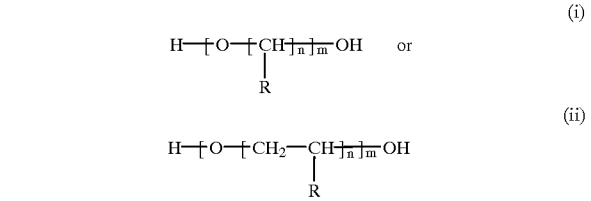

where the substituent R is hydrogen or lower alkyl containing from 1 to 5 carbon atoms including mixed substituents, and n is typically from 2 to 6 and m is from 8 to 100 or higher. Included are poly(oxytetramethylene) glycols, poly (oxytetraethylene) glycols, poly(oxy-1,2-propylene) glycols, and poly(oxy-1,2-butylene) glycols.

Also useful are polyether polyols formed from oxyalkylation of various polyols, for example, glycols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst.

Preferred polyethers include those sold under the names TERATHANE and TERACOL, available from E. I. Du Pont de Nemours and Company, Inc.

The hydroxyl functional polyether polymer or oligomer used in the process of the present invention preferably has a number average molecular weight of from about 500 to 5000, more preferably from about 1100 to 3200 as determined by gel permeation chromatography using a polystyrene standard, and a hydroxyl number of 35 to 180. Hydroxyl number (or hydroxyl value) is measured using the method of C. L. Ogg, W. L. Porter, *Ind. Eng. Chem. Anal. Ed.*, Vol. 17, pp. 394–397, 1945.

The hydroxyl functional acrylic polymers used in the process of the present invention are copolymers of one or more alkyl esters of acrylic acid or methacrylic acid, and, optionally, one or more other polymerizable ethylenically unsaturated monomers. Suitable alkyl esters of acrylic or methacrylic acid ("(meth)acrylates") include methyl (meth) acrylate, ethyl (meth)acrylate, propyl (meth)acrylate, butyl (meth)acrylate, 2-ethylhexyl (meth)acrylate, isobutyl (meth) acrylate, isobornyl (meth)acrylate, lauryl (meth)acrylate, cyclohexyl (meth)acrylate, and the like. Suitable other polymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic polymers contain hydroxyl functionality which is most often incorporated into the acrylic polymer through the use of hydroxyl functional monomers such as hydroxyethyl (meth)acrylate, hydroxypropyl (meth) acrylate, and 2- or 4-hydroxybutyl (meth)acrylate which may be copolymerized with the other acrylic monomers. Ethylenically unsaturated hydroxyl functional monomers derived from caprolactone, such as those available from Union Carbide Company under the name TONE, may also be used to prepare the hydroxyl functional polymer.

Hydroxyl functional monomers may also be selected from:

a) a reaction product of an ethylenically unsaturated, epoxy functional monomer and a saturated carboxylic acid having about 7 to about 20 carbon atoms; and b) a reaction product of an ethylenically unsaturated acid functional monomer and an epoxy compound containing at least 5 carbon atoms which is not polymerizable with the ethylenically unsaturated acid functional monomer.

Examples of ethylenically unsaturated, epoxy functional monomers used to prepare the hydroxyl functional monomers of a) above include glycidyl acrylate, glycidyl methacrylate, allyl glycidyl ether, methallyl glycidyl ether, 1:1 (molar) adducts of ethylenically unsaturated monoisocyanates such as meta-isopropenyl-alpa,alpha,-dimethylbenzyl isocyanate with hydroxyl functional monoepoxides such as glycidol, and glycidyl esters of polymerizable polycarboxylic acids such as maleic acid, fumaric acid, and crotonic acid. Preferred are the epoxy-functional acrylates such as glycidyl acrylate, epoxy functional methacrylates such as glycidyl methacrylates, or mixtures thereof. Glycidyl methacrylate is particularly preferred.

Examples of saturated carboxylic acids used to prepare the hydroxyl functional monomers of a) include saturated monocarboxylic acids such as those which are noncrystalline at room temperature, particularly those having branched structures. Isostearic acid is preferred; neoheptanoic and neodecanoic acids are also among those which are suitable. As used herein the term "saturated" as in the phrase "saturated monocarboxylic acid" is intended to denote the absence of ethylenic unsaturation but is not intended to exclude aromatic unsaturation as found, for example, in a benzene ring.

The hydroxyl functional monomer of a) may be prepared in several ways, for example (1) the saturated carboxylic acid and unsaturated epoxy functional monomer can be pre-esterified using conventional techniques prior to polymerization and the resultant reaction product addition polymerized using conventional techniques, for example, by free radical initiated polymerization; (2) the unsaturated epoxy functional monomer can be addition polymerized using conventional techniques, typically along with one or more hydroxyalkyl functional monomers and one or more other additional ethylenically unsaturated monomers, in the presence of the saturated carboxylic acid under conditions which promote the carboxyl/epoxy esterification reaction; and (3) the unsaturated epoxy functional monomer can be addition polymerized using conventional techniques, typically along with one or more hydroxyalkyl functional monomers and one or more other additional ethylenically unsaturated monomers, to form a polymeric product having epoxy functionality, which polymeric product can be subsequently esterified using conventional techniques by reaction with the saturated carboxylic acid.

When pre-esterification is conducted, it is usually done in the presence of a catalyst for promoting the epoxy/acid reaction such as tertiary amine, phosphine, zinc or tin catalyst. Also during pre-esterification, a free radical inhibitor may be used to inhibit polymerization.

When conducting esterification and polymerization simultaneously, the temperature should be high enough to ensure that the polymerization and esterification are occurring at about the same rate. Where desired, an esterification catalyst such as those mentioned above may be utilized. However, such a catalyst is not necessary if the reaction temperature is high enough; for example, greater than about 130° C.

The hydroxyl functional monomer of b) above is a reaction product of an ethylenically unsaturated acid functional monomer and an epoxy compound containing at least 5 carbon atoms which is not polymerizable with the ethylenically unsaturated acid functional monomer.

Examples of ethylenically unsaturated acid functional monomers used to prepare the hydroxyl functional monomer of b) include monocarboxylic acids such as acrylic acid, methacrylic acid, and crotonic acid; dicarboxylic acids such as itaconic acid, maleic acid, and fumaric acid; and monoesters of dicarboxylic acids such as monobutyl maleate and monobutyl itaconate. Acrylic acid and methacrylic acid are preferred.

The epoxy compound used to prepare the hydroxyl functional monomer of b) does not contain ethylenic unsaturation which would participate in free radical initiated polymerization with the unsaturated acid monomer. Examples of such epoxy compounds are glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

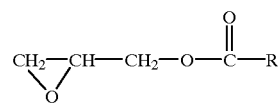

wherein R is a hydrocarbon radical containing from about 4 to about 26 carbon atoms. Preferably, R is a branched hydrocarbon radical, more preferably a tertiary aliphatic group of about 8 to about 10 carbon atoms such as neopentanoate, neoheptanoate, and neodecanoate. Glycidyl esters of commercially available mixtures of tertiary aliphatic carboxylic acids such as those available from Shell Chemical Company as VERSATIC ACID 911 are particularly preferred. The glycidyl esters themselves are also commercially available from Shell Chemical Company as CARDURA E. Examples of other epoxy compounds are 1,2-pentene oxide and styrene oxide.

The ethylenically unsaturated acid functional monomer and epoxy compound are typically reacted together in an equivalent ratio (acid to epoxy) of about 1:1 to prepare the hydroxyl functional monomer of b). The ethylenically unsaturated acid functional monomer and epoxy compound may be pre-esterified prior to free radical initiated polymerization, or esterification and polymerization may take place simultaneously.

The hydroxyl functional acrylic polymer used in the process of the present invention may be prepared by any polymerization technique known to those skilled in the art. Most often, the acrylic polymer is prepared by solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art.

The hydroxyl functional acrylic polymer used in the process of the present invention typically has a number average molecular weight of from about 900 to 13,000, preferably from about 1000 to 5000 as determined by gel permeation chromatography using a polystyrene standard, and a hydroxyl number of 1 to 485.

Linear or branched polyester polyols may also be used in the process of the present invention and may be prepared by the polyesterification of a polycarboxylic acid or anhydride thereof with excess polyols and/or an epoxide, using any polymerization technique known to those skilled in the art. Usually, the polycarboxylic acids and polyols are aliphatic or aromatic dibasic acids and diols. Transesterification of polycarboxylic acid esters is also possible.

The polyols which are usually employed in making the polyester include alkylene glycols, such as ethylene glycol, propylene glycol, neopentyl glycol, and other diols, such as trimethylpentane diol, hydrogenated Bisphenol A, cyclohexanediol, cyclohexanedimethanol, caprolactonediol, the reaction product of epsilon-caprolactone and ethylene glycol, hydroxy-alkylated bisphenols, polyether glycols, for example, poly(oxytetramethylene) glycol and the like. Polyols of higher functionality may also be used. Examples include trimethylolpropane, trimethylolethane, pentaerythritol and the like.

The acid component of the polyester consists primarily of monomeric carboxylic acids or anhydrides thereof having 2 to 18 carbon atoms per molecule. Among the acids which are useful are cycloaliphatic acids and anhydrides such as phthalic acid, isophthalic acid, terephthalic acid, tetrahydrophthalic acid, hexahydrophthalic acid, methylhexahydrophthalic acid, 1,3-cyclohexane dicarboxylic acid, and 1,4-cyclohexane dicarboxylic acid. Other suitable acids include adipic acid, azelaic acid, sebacic acid, maleic acid, glutaric acid, decanoic diacid, dodecanoic diacid and other dicarboxylic acids of various types. Lower alkyl diacids, that is, acids having less than about 10 carbon atoms such as adipic acid, are preferred. The polyester may include minor amounts of monobasic acids such as benzoic acid, stearic acid, acetic acid, and oleic acid. Also, there may be employed higher carboxylic acids such as trimellitic acid and tricarballylic acid. Where acids are referred to above, it is understood that anhydrides thereof which exist may be used in place of the acid. Also, lower alkyl esters of diacids such as dimethyl glutarate and dimethyl terephthalate may be used. Cycloaliphatic acids and anhydrides are particularly preferred.

The hydroxyl functional polyester polymer or oligomer used in the process of the present invention typically has a number average molecular weight of from about 600 to 3500, preferably from about 800 to 2000 as determined by gel permeation chromatography using a polystyrene standard, and a hydroxyl number of 1 to 850.

Polyurethanes can also be used in the process of the present invention. Among the polyurethanes which can be used are polymeric or oligomeric polyols which are prepared by reacting diols, alkylene glycols, or triols with a polyisocyanate such that the OH/NCO equivalent ratio is greater than 1:1 so that free hydroxyl groups are present in the product. The polyols which may be employed in making the polyurethane include those disclosed above in making the polyester.

Other polyurethanes which can be used are polymeric or oligomeric polyols which are prepared by "chain extending" hydroxyl functional polyester, acrylic, or polyether polymers or oligomers such as those mentioned above with a polyisocyanate such that the OH/NCO equivalent ratio is greater than 1:1 so that free hydroxyl groups are present in the product.

The organic polyisocyanate which is used to prepare the hydroxyl functional polyurethane can be an aliphatic or an aromatic polyisocyanate or a mixture of the two. Diisocyanates are preferred, although higher polyisocyanates can be used in place of or in combination with diisocyanates.

Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

The hydroxyl functional polyurethane polymer or oligomer used in the process of the present invention typically has a number average molecular weight of from about 300 to 3000, preferably from about 300 to 600 as determined by gel permeation chromatography using a polystyrene standard, and a hydroxyl number of 1 to 650.

In the process of the present invention, carbamate functional groups are incorporated into the hydroxyl functional polymer or oligomer by a "transcarbamoylation" reaction. In this reaction, a lower alkyl carbamate is reacted in a reaction mixture with the hydroxyl functional polymer or oligomer, in the presence of an alcohol different from and having a higher boiling point than the alcohol from which the lower alkyl carbamate is derived. (For example, if methyl carbamate is being used in the reaction mixture, the alcohol to be added must have a boiling point higher than that of methanol.) Although not intending to be bound by any theory, it is believed that the alcohol added to the reaction mixture increases the solubility of the lower alkyl carbamate in the reaction mixture and converts it to the less volatile carbamoylation reagent improving the overall conversion of hydroxyl to carbamate groups in the polymer or oligomer.

Along with the hydroxyl functional polymer or oligomer, the alcohol added to the reaction mixture also reacts with the lower alkyl carbamate to form its own corresponding carbamate. Preferably, the carbamate of the alcohol also has a higher boiling point than the lower alkyl carbamate. Without being bound by theory, it is presumed that during the initial stages of the reaction a complex equilibrium mixture of lower alkyl carbamate, its corresponding alcohol (i.e., the alcohol from which it is derived), the initially charged alcohol, its corresponding carbamate, and a polymer or oligomer having both hydroxyl and carbamate groups are simultaneously present. Conversion of hydroxyl groups to carbamate groups on the polymer/oligomer and the alcohol present in the reaction mixture is driven by removal of the byproduct alcohol corresponding to the lower alkyl carbamate, which forms during the reaction. Removal of the byproduct alcohol is typically by distillation. Because the carbamate formed in situ has a higher boiling point than the lower alkyl carbamate added as part of the reaction mixture, more aggressive reaction conditions such as higher temperatures, or more preferably, reduced pressure can be employed (compared to those used in the process conducted in the absence of the alcohol) to remove the alcohol byproduct from the reaction mixture. This results in improved conversion of hydroxyl groups to carbamate groups in the polymer or oligomer and more efficient use of the carbamoylation reagent. Such improvements are especially noticeable in large-scale reaction processes. Conversion, expressed as a percent, is the change in hydroxyl number of the polymer or oligomer over the course of the reaction divided by the original hydroxyl number of the polymer or oligomer. Hydroxyl number, as indicated earlier, is measured using the method of C. L. Ogg, W. L. Porter, *Ind. Eng. Chem. Anal. Ed.*, Vol. 17, pp. 394–397, 1945.

Examples of suitable lower alkyl carbamates include those having from 1 to 4 carbon atoms on the alkyl group. The carbamate group may be N-substituted or unsubstituted. Substituents typically include linear or branched aliphatic groups having from 1 to 8 carbon atoms, cycloaliphatic groups having from 6 to 10 carbon atoms, and aromatic groups having from 6 to 10 carbon atoms. Suitable lower alkyl carbamates are preferably unsubstituted and include, for example, methyl carbamate, which is preferred, ethyl carbamate, n-propyl carbamate, isopropyl carbamate, and n-butyl carbamate.

The amount of lower alkyl carbamate added to the reaction mixture depends on the level of hydroxyl functionality in the polymer or oligomer, and on the degree of conversion desired. Higher hydroxyl functionality and higher degrees of conversion will require more lower alkyl carbamate.

Suitable alcohols used to prepare the reaction mixture include lower molecular weight aliphatic, including linear or branched aliphatic, cycloaliphatic, and aromatic alcohols. Monofunctional alcohols are preferred. The alcohol should be chosen such that its boiling point is higher than that of the alcohol from which the lower alkyl carbamate being used is derived. The alcohol added to the reaction mixture typically has a boiling point ranging from 75° C. to 200° C., preferably from 75° C. to 130° C. Higher boiling points require higher reaction temperatures, which may lead to yellowing of the polymer or oligomer. Examples of suitable alcohols include ethanol, n-propanol, isopropanol, n-butanol, isobutanol, sec-butanol, amyl alcohol, cyclohexanol, 2-ethylhexanol, benzyl alcohol, and 3-methylbutanol. Suitable glycol ethers include ethylene glycol methyl ether, diethylene glycol methyl ether, ethylene glycol ethyl ether, ethylene glycol butyl ether, propylene glycol methyl ether, dipropylene glycol methyl ether, and propylene glycol isobutyl ether. Propylene glycol methyl ether is preferred.

Typically the molar ratio of lower alkyl carbamate to alcohol used to prepare the reaction mixture is from 1:10 to 10:1, preferably from 1:2 to 2:1.

Reaction conditions are as follows: The hydroxyl functional polymer or oligomer, lower alkyl carbamate, and alcohol are charged to the reactor and heated to a temperature between 140° and 160° C. After an induction period, an atmospheric distillation is allowed to take place in order to remove the most volatile portion of distillate. A fractionation column can be used. When the rate of atmospheric distillation slows, the reaction mixture is typically cooled slightly to 135–145° C. and the reactor is equipped for distillation under reduced pressure. The reactor pressure is gradually reduced to maintain distillation until a final reactor pressure of about 60 mm Hg is attained. If desired, the resulting resinous material can be reduced with any suitable solvent.

Preferably, catalysts are used for the reaction. Suitable catalysts are butyl stannoic acid, dibutyltin oxide, dibutyltin dilaurate, and other esterification catalysts known in the art. The catalyst is typically present in the reaction mixture in an amount of 0.05 to 1 percent by weight, based on the total weight of the reaction mixture.

In a separate embodiment of the invention, a carbamate functional acrylic polymer may be prepared in a process comprising: (a) preparing a reaction mixture comprising a lower alkyl carbamate, one or more acrylic monomers containing hydroxyl groups or groups that can be converted to hydroxyl groups, optionally one or more other ethylenically unsaturated monomers, and an alcohol different from and having a higher boiling point than an alcohol from which the lower alkyl carbamate is derived; and (b) heating the reaction mixture in the presence of a free radical initiator and an esterification catalyst to form a carbamate functional acrylic polymer. Such a process allows for the preparation of carbamate functional acrylic polymers in one step, in high yields and without significant loss of carbamoylation reagent. Additionally, there is improved conversion of hydroxyl groups to carbamate groups in the acrylic polymer, with more efficient use of the lower alkyl carbamate reagent, compared to polymerization without the presence of the alcohol. In this embodiment of the present invention, steps (a) and (b) need not be discreet steps; i. e., the reaction mixture can be prepared with the acrylic monomers added gradually as continuous feeds to the reaction mixture during the heating process and concurrent polymerization.

In this embodiment of the invention, suitable lower alkyl carbamates include those disclosed above, as well as those disclosed at column 3, lines 48–65 of U.S. Pat. No. 5,552,497, incorporated herein by reference in its entirety. Suitable monomers include those disclosed above, as well as those disclosed at column 2, line 60 to column 3, line 47 of U.S. Pat. No. 5,552,497. Suitable alcohols used to prepare the reaction mixture include those disclosed above.

The reaction mixture, after preparation, may be simultaneously polymerized and carbamoylated by heating the mixture in the presence of a free radical initiator and an esterification catalyst. Suitable free radical initiators include those disclosed at column 4, lines 3–15 of U.S. Pat. No. 5,552,497. Suitable esterification catalysts include those disclosed above, as well as those disclosed at column 4, lines 28–47 of U.S. Pat. No. 5,552,497.

The acrylic polymerization may be carried out as described in column 4, line 48 to column 5, line 21 of U.S. Pat. No. 5,552,497.

The amount of lower alkyl carbamate added to the reaction mixture depends on the amount of hydroxyl functional acrylic monomers being used, and on the degree of conversion desired. Higher hydroxyl functionality and higher degrees of conversion will require more lower alkyl carbamate. Typically the molar ratio of lower alkyl carbamate to alcohol used to prepare the reaction mixture is from 1:10 to 10:1, preferably from 1:2 to 2:1.

The invention will further be described by reference to the following examples. Unless otherwise indicated, all parts are by weight. Examples 1 through 8 illustrate the preparation of various polymers with carbamate functionality. Examples 1, 3, 5, and 6–8 are illustrative of the present invention. Examples 2 and 4 are comparative, illustrating the preparation of carbamate functional polymers without the use of alcohol in the reaction mixture.

EXAMPLE 1

A carbamate functional acrylic polymer was prepared from the following ingredients:

| Ingredient | Weight in parts |
| --- | --- |
| Acrylic polymer solution[1] | 413.6 |
| Methyl carbamate | 58.7 |
| DOWANOL PM[2] | 39.0 |
| Butyl stannoic acid | 0.7 |
| Triphenyl phosphite | 0.7 |

[1]Made from hydroxyethyl methacrylate/2-ethylhexyl acrylate/styrene/alpha-methylstyrene dimer/acrylic acid/CARDURA E (Glycidyl esters of mixtures of tertiary aliphatic carboxylic acids, available from Shell Chemical Company) in a 19.0:9.8:30:3.3:8.3:28.7 weight ratio, 90.8% solids in DOWANOL PM.
[2]Propylene glycol methyl ether, available from Dow Chemical Co.

A suitable reactor equipped with a thermocouple, overhead stirrer, nitrogen inlet and a reflux condenser was charged with the above ingredients. The reaction mixture was heated to 145° C. under a nitrogen blanket. At this temperature, reflux was observed. The reaction mixture was held at this temperature for one hour. After the hold period was complete, the reflux condenser was removed, and the reactor equipped for distillation (short column, still head, thermocouple, and receiver) at atmospheric pressure. Distillate began to come over at 147° C. The temperature of the reaction was gradually raised to 151° C. to maintain a steady rate of distillation. At this point 25 parts of distillate had been collected. The reaction mixture was then cooled to 140° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be 54.3. The additional distillate collected totaled 76 parts. The contents of the reactor were then diluted with 167 parts of Aromatic 100 and 83 parts xylene. The final resin solution was found to have a measured solids of 58.7%, a weight average molecular weight of 10373 and a number average molecular weight of 3155, as determined by gel permeation chromatography using a polystyrene standard.

EXAMPLE 2 (COMPARATIVE)

A carbamate-functional acrylic polymer was prepared from the following ingredients:

| Ingredient | Weight in parts |
| --- | --- |
| Acrylic polymer solution[1] | 433.0 |
| Methyl carbamate | 45.6 |
| Butyl stannoic acid | 6.2 |
| Triphenyl phosphite | 6.2 |
| Xylene | 14.0 |
| SOLVESSO 100[2] | 28.3 |

[1]Made from hydroxyethyl methacrylate/2-ethylhexyl acrylate/styrene/acrylic acid/CARDURA E in a 19.9:13.9:30:8.3:28.65 weight ratio, at 64.3% solids in SOLVESSO 100/xylene (67/33).
[2]Blend of aromatic solvents available from Exxon Chemicals America.

A suitable reactor was charged with the above ingredients and equipped with a thermocouple, overhead stirrer, nitrogen inlet and a reflux condenser. The mixture was heated to 144° C. under a nitrogen blanket. At this temperature, the reaction refluxed slightly. The reaction mixture was held for one hour at 145° C. After the hold period was complete, the reflux condenser was removed, and the reactor equipped for distillation (short column, still head, thermocouple, and receiver flask) at atmospheric pressure. Distillate began to come over at 145° C. The temperature of the reaction was gradually raised over 6 hours to 155° C. to maintain a steady rate of distillation. When the distillation was essentially stopped, and approximately 15 parts of distillate had been collected, the reaction mixture was sampled and the hydroxyl value found to be 36.3 at 60.7% solids. The contents of the reactor were cooled. The final resin solution was found to have a measured solids of 60.7% and a weight average molecular weight of 6920 as determined by gel permeation chromatography using a polystyrene standard.

EXAMPLE 3

A carbamate-functional polyester was prepared from the following ingredients:

| Ingredient | Weight in parts |
| --- | --- |
| Polyester[1] | 375.1 |
| Methyl carbamate | 71.9 |
| Butyl stannoic acid | 1.0 |
| Triphenyl phosphite | 0.8 |
| DOWANOL PM | 35.0 |

[1]Made from 2,2,4-trimethyl-1,3-pentanediol/trimethylol-propane/neopentyl glycol/hexahydrophthalic anhydride in a 22.7:10.6:17.5:49.2 weight ratio, 100% solids.

A suitable reactor was charged with the above ingredients and equipped with a thermocouple, overhead stirrer, nitrogen inlet and a reflux condenser. The mixture was heated to 141° C. under a nitrogen blanket. At this temperature reflux was observed. The reaction mixture was held at reflux for one hour. After the hold period was complete, the reflux condenser was removed, and the reactor equipped for distillation (short column, still head, thermocouple, and receiver) at atmospheric pressure. Distillate began to come over at 132° C. The temperature of the reaction was gradually raised to 151° C. to maintain a steady rate of distillation. At this point 28.7 parts of distillate had been collected. The reaction mixture was then cooled to 145° C. and equipped for simple vacuum distillation (still head, vacuum adapter, receiver flask). Distillation was resumed under reduced pressure; the pressure inside the reactor was gradually reduced to maintain distillation until a reactor pressure of 60-mm Hg was attained. When the distillation was essentially stopped, the reaction mixture was sampled and the hydroxyl value found to be acceptable (33.8). The additional distillate collected totaled 78.3 parts. The contents of the reactor were cooled and then diluted with 140 parts of DOWANOL PM. The final resin solution was found to have a measured solids of 72.2%, a weight average molecular weight of 2197 and a number average molecular weight of 1202, as determined by gel permeation chromatography using a polystyrene standard.

EXAMPLE 4 (COMPARATIVE)

A carbamate-functional polyester was prepared from the following ingredients:

| Ingredient | Weight in part |
|---|---|
| Polyester from Example 3 | 2725.8 |
| Methyl carbamate | 500.0 |
| Butyl stannoic acid | 5.7 |
| Triphenyl phosphite | 5.7 |
| Ethyl 3-ethoxypropionate | 252.6 |
| SOLVESSO 100 | 350.0 |

A suitable reactor was charged with the above ingredients and equipped with a thermocouple, overhead stirrer, nitrogen inlet and a reflux condenser. The mixture was heated to 150° C. under a nitrogen blanket. At this temperature, the reaction refluxed slightly. The reaction mixture was held for one hour at 150° C. After the hold period was complete, the reflux condenser was removed, and the reactor equipped for distillation (short column, still head, thermocouple, and receiver) at atmospheric pressure. Distillate began to come over at 150° C. The temperature of the reaction was gradually raised over 6 hours to 155° C. to maintain a steady rate of distillation. When the distillation was essentially stopped, and approximately 485 parts of distillate had been collected, the reaction mixture was sampled and the hydroxyl value found to be 40.5 at 83% solids. The contents of the reactor were cooled and then diluted with 90 parts ethyl 3-ethoxypropionate and 725 parts of SOLVESSO 100. The final resin solution was found to have a measured solids of 69%, a weight average molecular weight of 2203 and a number average molecular weight of 1155, as determined by gel permeation chromatography using a polystyrene standard.

TABLE 1

Comparison of Carbamoylation Level, Residuals and Efficiency of Methyl Carbamate (MEC) Incorporation

| Example | OH# of pre-polymer | Final OH# | Conversion[1] | % Residual MEC | Efficiency of MEC Incorporation[2] |
|---|---|---|---|---|---|
| Example 1 | 147 | 54.3 | 63% | 0.1% | 82% |
| Comparative Example 2 | 147 | 59.8 | 59% | 0.5% | 71% |
| Example 3 | 143 | 33.8 | 76% | 0.1% | 78% |
| Comparative Example 4 | 143 | 48.8 | 65% | 1.1% | 73% |

Note: All OH#s have been adjusted to 100% solids for comparison purposes.
[1]Expressed as a percent, the change in analytically determined hydroxyl number of the polymer or oligomer over the course of the reaction divided by the original analytically determined hydroxyl number of the polymer or oligomer.
[2]Efficiency is defined as actual conversion (note 1 above) divided by the theoretical maximum conversion, calculated based on the initial number of equivalents of lower alkyl carbamate in the reaction mixture.

The data in the table indicate that the process of the present invention improves the extent of carb-moylation of a polymer or oligomer and reduces the amount of residual lower alkyl carbamate in the reaction mixture after reaction, compared to processes that do not include an alcohol in the reaction mixture (Examples 2 and 4).

EXAMPLE 5

A carbamate-functional polyester was prepared from the following ingredients:

| Ingredient | Weight in parts |
|---|---|
| Polyester from Example 3 | 1152.4 |
| Methyl carbamate | 180.2 |
| Butyl stannoic acid | 2.4 |
| Triphenyl phosphite | 2.4 |
| Butanol | 177.9 |

A suitable reactor was charged with the above ingredients and equipped with a thermocouple, overhead stirrer, nitrogen inlet and a reflux condenser. The mixture was heated to 139° C. under a nitrogen blanket. At this temperature reflux was observed. The reaction mixture was held at reflux for one hour. After the hold period was complete, the reflux condenser was removed, and the reactor equipped for distillation (short column, still head, thermocouple, and receiver flask) at atmospheric pressure. Distillate began to come over at 142° C. The temperature of the reaction was gradually raised to 144° C. to maintain a steady rate of distillation. At this point 2.6 parts of distillate had been collected. The reactor was then equipped for simple vacuum distillation (still head, vacuum adapter, receiver flask). Distillation was resumed under reduced pressure. The pressure inside the reactor was gradually reduced to maintain distillation until a reactor pressure of 60-mm Hg was attained. When the distillation was essentially stopped, the reaction mixture was sampled and the hydroxyl value found to be acceptable (24.2). The additional distillate collected totaled 157 parts. The contents of the reactor were cooled and then diluted with 420 parts of DOWANOL PM Acetate. The final resin solution was found to have a measured solids of 71.8%.

EXAMPLE 6

A carbamate-functional polyester was prepared from the following ingredients:

| Ingredient | Weight in parts |
|---|---|
| Polyester from Example 3 | 1152.4 |
| Methyl carbamate | 180.2 |
| Butyl stannoic acid | 2.4 |
| Triphenyl phosphite | 2.4 |
| n-propanol | 144.2 |

A suitable reactor was charged with the above ingredients and equipped with a thermocouple, overhead stirrer, nitrogen inlet and a reflux condenser. The mixture was heated to 122° C. under a nitrogen blanket. At this temperature reflux was observed. The reaction mixture was held at reflux for one hour. After the hold period was complete, the reflux condenser was removed, and the reactor equipped for distillation (short column, still head, thermocouple, and receiver flask) at atmospheric pressure. Distillate began to come over at 130° C. The temperature of the reaction was gradually raised to 151° C. to maintain a steady rate of distillation. At this point 127 parts of distillate had been collected. The reactor was then equipped for simple vacuum distillation (still head, vacuum adapter, receiver flask). Distillation was resumed under reduced pressure. The pressure inside the reactor was gradually reduced to maintain distillation until a reactor pressure of 60-mm Hg was attained.

When the distillation was essentially stopped, the reaction mixture was sampled and the hydroxyl value found to be acceptable (20.7). The contents of the reactor were cooled and then diluted with 420 parts of DOWANOL PM Acetate. The final resin solution was found to have a measured solids of 72.8%.

EXAMPLE 7

A carbamate functional polyether was prepared from the following ingredients:

| Ingredient | Weight in grams |
|---|---|
| TERATHANE 1000[1] | 1400.2 |
| Methyl carbamate | 210.3 |
| Butyl stannoic acid | 4.9 |
| Triphenyl Phosphite | 3.2 |
| DOWANOL PM | 269.7 |

[1]Polytetramethylene glycol having an Mn of 950 to 1050 and an OH value of 7 to 118, available from E.I. Du Pont de Nemours and Co., Inc.

A suitable reactor was charged with the above ingredients and equipped with a thermocouple, overhead stirrer, nitrogen inlet and a reflux condenser. The material was heated to 143° C. under a nitrogen blanket. At this temperature reflux was observed; the reaction mixture was held at this temperature for one hour. After the hold period was complete, the reaction mixture was cooled to 135° C., the reflux condenser was removed, and the reactor equipped for distillation (short packed column, still head, thermocouple, condenser, and receiver flask) at atmospheric pressure. Distillate began to come over at 141° C.; the temperature was gradually raised to 155° C. to maintain distillation. At this point 79.3 g of distillate had been collected. The reaction mixture was then cooled to 140° C. and equipped for simple vacuum distillation (still head, thermocouple, condenser, vacuum adapter, receiver flask.) Distillation was resumed under reduced pressure; the pressure inside the reactor was gradually reduced to maintain distillation until a reactor pressure of 60 mm Hg was attained. When the distillation was essentially stopped, the reaction mixture was sampled and the hydroxyl value found to be acceptable. The additional distillate collected totaled 258.3 g. The contents of the reactor were then poured out. The resulting material was a slightly hazy liquid when warm with a color of 40 as measured on the APHA scale; it solidified to a soft, white, waxy opaque material upon standing at ambient temperature. The final material was found to have a hydroxyl value of 15.8, a measured solids of 98.4%, a weight average molecular weight of 3384, and a number average molecular weight of 1515 as determined by gel permeation chromatography using a polystyrene standard.

EXAMPLE 8

A carbamate functional acrylic resin was prepared from the following ingredients:

| Charge 1 | Weight in grams |
|---|---|
| Methyl carbamate | 193.8 (2.58 equiv.) |
| DOWANOL PM | 193.8 |
| Charge 2 | |
| Butyl stannoic acid | 5.3 |
| Charge 3 | |
| VAZO 67[1] | 69.8 |
| DOWANOL PM | 139.5 |
| Charge 4 | |
| Hydroxyethyl methacrylate | 337.2 (2.59 equiv.) |
| Styrene | 116.8 |
| 2-ethylhexyl methacrylate | 93.2 |
| 2-ethylhexyl acrylate | 228.7 |
| Charge 5 | |
| VAZO 67 | 11.6 |
| DOWANOL PM | 34.9 |
| Charge 6 | |
| Amyl acetate | 282.9 |
| Ethyl 3-ethoxypropionate | 282.8 |

[1]2,2'-Azobis (2-methylbutanenitrile), commercially available from E.I. Du Pont de Nemours and Company.

Charges 1 and 2 were added to a suitable reactor which was equipped with a thermocouple, overhead stirrer, nitrogen inlet, a long (15 inch) Vigreux column, and a variable reflux distillation head. The material in the reactor was heated to reflux temperature (135° C.) and Charges 3 and 4 were added to the reactor over a period of 4 hours. In the initial stages of the reaction, some white material was observed in the Vigreux column, but within the first hour of the Charge 3 and 4 additions the material was washed back down into the reactor by the refluxing solvent. When Charge 4 was complete, Charge 5 was added to the reactor over 30 minutes; the reaction was held at reflux an additional 30 minutes and cooled to ambient temperature. The maximum height of reflux during the acrylic monomer and initiator feeds and the post initiator feed was approximately 40 percent of the length of the column; no distillate was collected in the receiving flask. The Vigreux column and variable reflux distillation head were replaced with a short column packed with ceramic saddles and a normal distillation head. The contents of the reactor were reheated to 135° C.; at this temperature distillate began to come over. The temperature was slowly increased to 150° C. to maintain steady distillation. At this point 84.6 g of distillate (presumably mostly methanol) had been collected. The reactor was then equipped for simple vacuum distillation and the reaction temperature adjusted to 140° C. Distillation was resumed under reduced pressure; the pressure inside the reactor was gradually reduced to maintain distillation until a reactor pressure of approximately 60 mm Hg was obtained. At this point 336.1 g of additional distillate (presumably DOWANOL PM) had been collected. The resulting resinous material was thinned with Charge 6 prior to fill out. Prior to thinning, the material was found to have a OH value of 6.8 (corresponding to approximately 96 percent conversion of OH groups to carbamate groups). The reduced material was a clear resinous liquid with a color of 80–100 on the APHA color scale, a measured solids of 60.8 percent, a viscosity of Z1 on the Gardner-Holt scale, a residual methyl carbamate content of <0.01 percent as determined by gas chromatography, a weight average molecular weight of 7682, and a number average molecular weight of 2996 as determined by gel permeation chromatography using a polystyrene standard.

The process of this example may be compared to Example 1 of U.S. Pat. No. 5,552,497, wherein an acrylic polymer is prepared using the same relative amounts of identical monomers without the use of an alcohol having a boiling point higher than the alcohol from which the lower alkyl carbamate is derived. In the '497 patent, an equivalent ratio of 1.3:1 (carbamate to polymer hydroxyl groups) is required to achieve 90–95% conversion of hydroxyl groups, whereas in the process of the present invention as shown in Example 8, an equivalent ratio of only 1:1 yields a 96% conversion of hydroxyl groups to carbamate groups. The use of the alcohol in the process of the present invention clearly improves the efficiency of the carbamoylation reaction with respect to the amount of lower alkyl carbamate needed in the reaction mixture.

The invention has been described in detail herein. It should be understood, however, that modifications can be made without departing from the spirit and scope of the invention.

We claim:

1. A method of preparing a carbamate functional polymer or oligomer comprising:
   (a) preparing a reaction mixture comprising a lower alkyl carbamate, a hydroxyl functional polymer or oligomer, and an alcohol different from and having a higher boiling point than an alcohol from which the lower alkyl carbamate is derived; and
   (b) heating the reaction mixture to form a carbamate functional polymer or oligomer.

2. The method of claim 1 wherein the alcohol used to prepare the reaction mixture is monofunctional.

3. The method of claim 2 wherein the alcohol used to prepare the reaction mixture has a boiling point ranging from 75° C. to 200° C.

4. The method of claim 3 wherein the alcohol used to prepare the reaction mixture is a glycol ether.

5. The method of claim 4 wherein the glycol ether is selected from the group consisting of ethylene glycol methyl ether, diethylene glycol methyl ether, ethylene glycol ethyl ether, ethylene glycol butyl ether, propylene glycol methyl ether, dipropylene glycol methyl ether, and propylene glycol isobutyl ether.

6. The method of claim 5 wherein the glycol ether is propylene glycol methyl ether.

7. The method of claim 1 wherein the molar ratio of lower alkyl carbamate to alcohol used to prepare the reaction mixture is from 1:10 to 10:1.

8. The method of claim 1 wherein the hydroxyl functional polymer or oligomer is a polyether polyol.

9. The method of claim 1 wherein the hydroxyl functional polymer or oligomer is a polyurethane polyol.

10. The method of claim 1 wherein the hydroxyl functional polymer or oligomer is an acrylic polyol.

11. The method of claim 1 wherein the hydroxyl functional polymer or oligomer is a polyester polyol.

12. The method of claim 1 wherein the lower alkyl carbamate has from 1 to 4 carbon atoms in the alkyl group.

13. The method of claim 12 wherein the lower alkyl carbamate is methyl carbamate.

14. The method of claim 1 wherein the reaction mixture is heated in the presence of catalyst.

15. The method of claim 14 wherein the catalyst is present in an amount of 0.05 to 1 percent by weight, based on the total weight of the reaction mixture.

* * * * *